(12) United States Patent
Venkatesh (10) Patent No.: US 7,580,545 B2
(45) Date of Patent: Aug. 25, 2009

(54) METHOD AND SYSTEM FOR DETERMINING GAZE DIRECTION IN A PUPIL DETECTION SYSTEM

(75) Inventor: Shalini Venkatesh, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 599 days.

(21) Appl. No.: 11/243,442

(22) Filed: Oct. 3, 2005

(65) Prior Publication Data

US 2007/0076958 A1   Apr. 5, 2007

(51) Int. Cl.
*G06K 9/00* (2006.01)
(52) U.S. Cl. .................................... 382/103
(58) Field of Classification Search ............... 382/100, 382/103–107, 115, 117, 128, 118; 348/169–172
See application file for complete search history.

(56) References Cited

U.S. PATENT DOCUMENTS

| | | | | |
|---|---|---|---|---|
| 5,325,133 A * | 6/1994 | Adachi | ....................... | 351/209 |
| 6,144,366 A * | 11/2000 | Numazaki et al. | ........... | 345/156 |
| 6,231,185 B1 * | 5/2001 | Pipa | ........................... | 351/208 |
| 6,580,448 B1 * | 6/2003 | Stuttler | ........................ | 348/46 |
| 6,810,135 B1 * | 10/2004 | Berenz et al. | ............... | 382/118 |
| 2002/0102010 A1 * | 8/2002 | Liu et al. | .................... | 382/107 |
| 2003/0169907 A1 * | 9/2003 | Edwards et al. | ............. | 382/118 |
| 2004/0005083 A1 * | 1/2004 | Fujimura et al. | ............ | 382/103 |
| 2004/0170304 A1 * | 9/2004 | Haven et al. | ................ | 382/115 |

\* cited by examiner

*Primary Examiner*—Samir A. Ahmed
*Assistant Examiner*—Atiba O Fitzpatrick (57) ABSTRACT

A detector captures one or more images of the face, eyes, or pupils of a person using light propagating at two or more angles of incidence with respect to the optical axis of the detector. A difference image is then generated by subtracting one image from another image. A computed location associated with the pupils in the difference image is then compared with a reference location to determine the gaze direction of the pupils.

20 Claims, 7 Drawing Sheets

METHOD AND SYSTEM FOR DETERMINING GAZE DIRECTION IN A PUPIL DETECTION SYSTEM

BACKGROUND

There are a number of applications in which it is of interest to estimate or determine the direction a person is looking. The analysis of human communications, medical testing, occupational safety procedures, and automobile driver alertness are all examples of different applications in which determining gaze direction is of interest. To determine the direction a person is looking, a picture of the person's face is captured using high resolution video or still cameras. The picture is then processed with appearance-based feature recognition and tracking techniques. Appearance-based feature recognition and tracking techniques typically use complex processing algorithms to perform high spatial resolution analysis. Systems that detect gaze direction in this manner, however, are usually expensive to purchase, install, and maintain.

SUMMARY

In accordance with the invention, a method and system for determining gaze direction in a pupil detection system are provided. A detector captures one or more images of the face, eyes, or pupils of a person using light propagating at two or more angles of incidence with respect to the optical axis of the detector. A difference image is then generated by subtracting one image from another image. The reflections from other facial and environmental features largely cancel out when one image is subtracted from another image, leaving the pupils as the dominant feature in the difference image. A computed location associated with the pupils in the difference image is then compared with a reference location to determine the gaze direction of the pupils.

DETAILED DESCRIPTION

The following description is presented to enable embodiments of the invention to be made and used, and is provided in the context of a patent application and its requirements. Various modifications to the disclosed embodiments will be readily apparent, and the generic principles herein may be applied to other embodiments. Thus, the invention is not intended to be limited to the embodiments shown, but is to be accorded the widest scope consistent with the appended claims and with the principles and features described herein. It should be understood that the drawings referred to in this description are not drawn to scale and that like reference numerals designate corresponding parts throughout the figures.

Embodiments in accordance with the invention relate to methods and systems for detecting a gaze direction in a pupil detection system. Pupil detection in a vehicle is included in the detailed description as one system that detects gaze direction. By way of example only, the gaze direction of a driver in a vehicle may be used to activate an alarm when the driver is looking somewhere other than the road. The alarm may be used to alert the driver to a potential safety hazard such as, for example, a possible collision with another vehicle or object.

Figure 1:
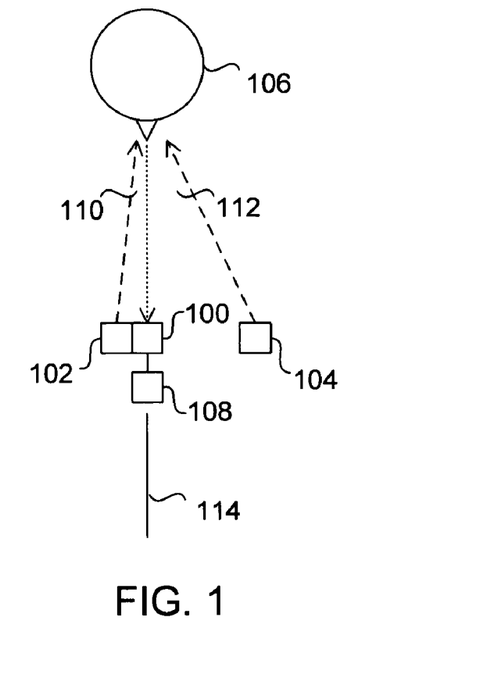
FIG. 1 is a diagram of a first pupil detection system in an embodiment in accordance with the invention.

FIG. 1 is a diagram of a first pupil detection system in an embodiment in accordance with the invention. The system includes detector 100 and light sources 102, 104. Light source 102 emits light at one wavelength ($\lambda_1$) while light source 104 emits light at a different wavelength ($\lambda_2$) in an embodiment in accordance with the invention.

Using light reflected off subject 106, detector 100 captures one or more composite images of the face, the eyes, or the pupils of subject 106 in an embodiment in accordance with the invention. A composite image is an image constructed from two sub-frame images that form a complete image of the object when combined. One sub-frame image in the composite image is captured with light emitted by light source 102 and the other sub-frame image is captured with light emitted by light source 104 in an embodiment in accordance with the invention. A detector capable of capturing sub-frames using light propagating at different wavelengths is discussed in more detail in conjunction with FIGS. 4 and 5.

Processing unit 108 receives the images captured by detector 100 and generates a difference image by subtracting one sub-frame image in the composite image from the other sub-frame image. In another embodiment in accordance with the invention, detector 100 captures distinct whole-frame images of the face, the eyes, or the pupils of subject 106. A difference image is then generated by subtracting one image from another image.

Processing unit 108 analyzes the difference image to distinguish and detect the pupils from the other features within the field of view of detector 100. Processing unit 108 may be a dedicated processing unit or it may be a shared processing device. When the eyes of subject 106 are open, the difference between the sub-frames in each composite image highlights the pupils. The gaze direction of the pupils is determined from the difference image in an embodiment in accordance with the invention.

Light sources that are used in systems designed to detect pupils typically emit light that yields substantially equal image intensity (brightness). Moreover, the wavelengths are generally chosen such that the light will not distract subject 106 and the iris of the pupil or pupils will not contract in response to the light. "Retinal return" refers to the intensity (brightness) that is reflected off the back of the pupil of subject 106 and detected at detector 100. "Retinal return" is also used to include reflection from other tissue at the back of the eye (other than or in addition to the retina). Differential reflectivity off a retina of subject 106 is dependent upon angles 110, 112 in an embodiment in accordance with the invention. In general, decreasing the size of angle 110 increases the retinal return. Accordingly, the sizes of angle 110 is selected such that light source 102 is on or close to axis 114 ("on-axis light sources"). In an embodiment in accordance with the invention, the size of angle 110 is typically in the range of approximately zero to two degrees.

The size of angle 112 is selected so that only low retinal return from light source 104 is detected at detector 100. The iris (surrounding the pupil) blocks this signal, and so pupil size under different lighting conditions should be considered when selecting the size of angle 104. The size of angle 104 is selected such that light source 104 is positioned away from axis 114 ("off-axis light sources"). In an embodiment in accordance with the invention, the size of angle 112 is typically in the range of approximately three to fifteen degrees.

Light sources 102, 104 are implemented as light-emitting diodes (LEDs) or multi-mode semiconductor lasers having infrared or near-infrared wavelengths in an embodiment in accordance with the invention. In other embodiments in accordance with the invention, light sources 102, 104 may be implemented with different types and different numbers of light sources. For example, light sources 102, 108 may be implemented as a single broadband light source, such as, for example, the sun.

And finally, the positioning of the light sources may be different from the configuration shown in FIG. 1. In another embodiment in accordance with the invention, light sources 102, 104, may be located on the same side of detector 100. And in yet another embodiment in accordance with the invention, a set of light sources 102, 104 may be positioned on both sides of detector 100. The number, position, and wavelengths of the light sources are determined by the application and the environment surrounding the subject or object to be detected.

Figure 2:
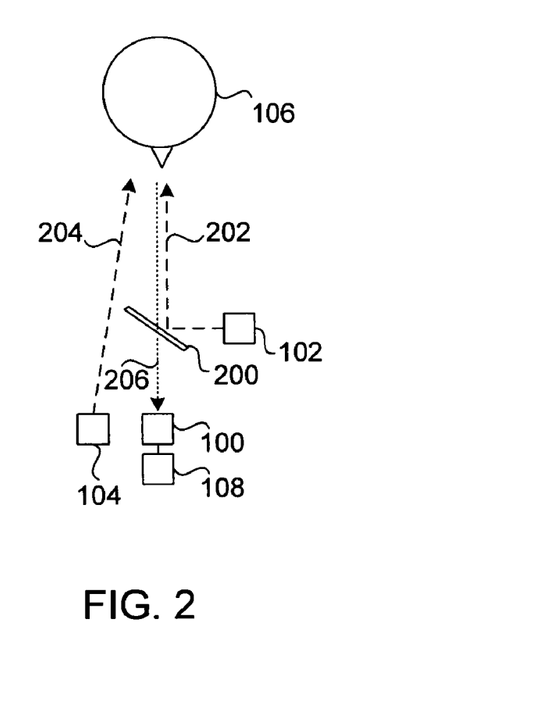
FIG. 2 is a diagram of a second pupil detection system in an embodiment in accordance with the invention.

Referring to FIG. 2, there is a second system for pupil detection in an embodiment in accordance with the invention. The system includes detector 100, on-axis light source 102, off-axis light source 104, processing unit 108, and beam splitter 200. In the embodiment shown in FIG. 2, detector 100 is positioned adjacent to light source 104. In other embodiments in accordance with the invention, the positioning of detector 100 and light source 102 may be interchanged, with light source 102 adjacent to light source 104.

On-axis light source 102 emits a beam of light towards beam splitter 200. Beam splitter 200 splits the on-axis light into two segments, with one segment 202 directed towards subject 106. A smaller yet effective on-axis angle of illumination is permitted when beam splitter 200 is placed between detector 100 and subject 106.

Off-axis light source 104 also emits beam of light 204 towards subject 106. Light from segments 202, 204 reflects off subject 106 towards beam splitter 200. Light from segments 202,204 may simultaneously reflect off subject 106 or alternately reflect off subject 106, depending on when light sources 102, 104 emit light. Beam splitter 200 splits the reflected light into two segments and directs one segment 206 towards detector 100. Detector 100 detects an image or images of subject 106 using the reflected light and transmits the images to processing unit 108.

Detector 100 captures a composite image in an embodiment in accordance with the invention. A difference image is then generated by subtracting one sub-frame from the other sub-frame in the composite image. In another embodiment in accordance with the invention, detector 100 captures distinct images of subject 106 and a difference image generated by subtracting one image from another image. Processing unit 108 analyzes the difference image to distinguish and detect the pupils and determine the gaze direction of the pupils in an embodiment in accordance with the invention.

Figure 3A:
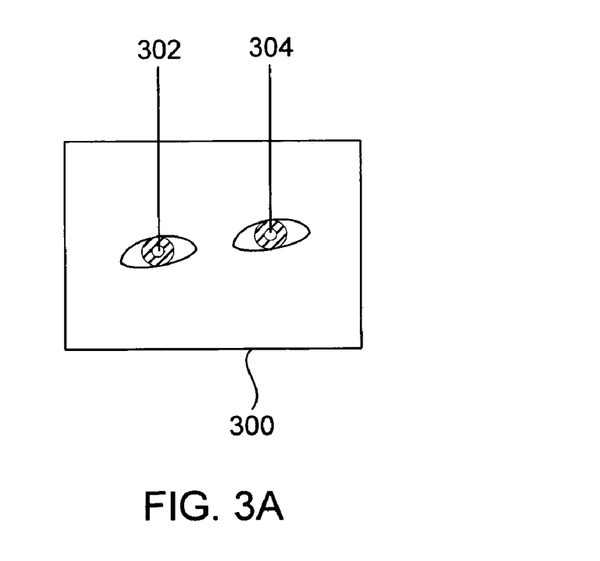
FIG. 3A illustrates an image captured with light emitted by on-axis light source 102 in accordance with the embodiments of FIG. 1 and FIG. 2.

FIG. 3A illustrates an image captured with light emitted by on-axis light source 102 in accordance with the embodiments of FIG. 1 and FIG. 2. Image 300 shows eyes 302, 304 open. The eyes have bright pupils due to a strong retinal return created by on-axis light source 102. If the eyes had been closed, or nearly closed, the bright pupils would not be detected and imaged.

Figure 3B:
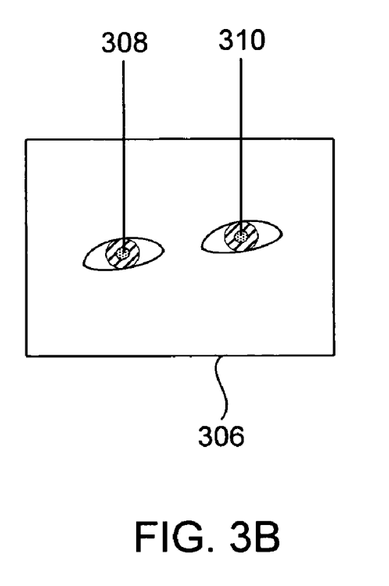
FIG. 3B depicts an image captured with light emitted by off-axis light source 104 in accordance with the embodiments of FIG. 1 and FIG. 2.

FIG. 3B illustrates an image captured with light emitted by off-axis light source 104 in accordance with the embodiments of FIG. 1 and FIG. 2. Image 306 may be taken at the same time as image 300 (FIG. 3A) or it may be successively taken to image 300. Image 306 illustrates eyes 308, 310 with normal, dark pupils. If the eyes had been closed or nearly closed, the pupils would not be detected and imaged.

Figure 3C:
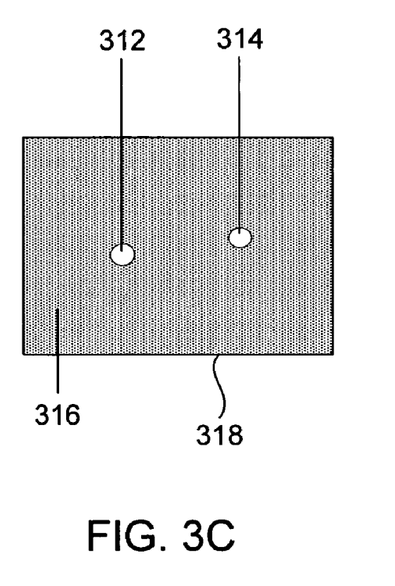
FIG. 3C illustrates a difference image resulting from the subtraction of the image in FIG. 3B from the image in FIG. 3A.

FIG. 3C illustrates a difference image resulting from the subtraction of the image in FIG. 3B from the image in FIG. 3A. By taking the difference between images 300, 306 the pupils are visible as two relatively bright spots 313, 314 against a relatively dark background 318. There may be vestiges of other features of the eye remaining in background 316. However, in general, bright spots 312, 314 will stand out in comparison to background 316. When the eyes are closed or nearly closed, bright spots 312, 314 will not be visible in difference image 318.

Figure 4:
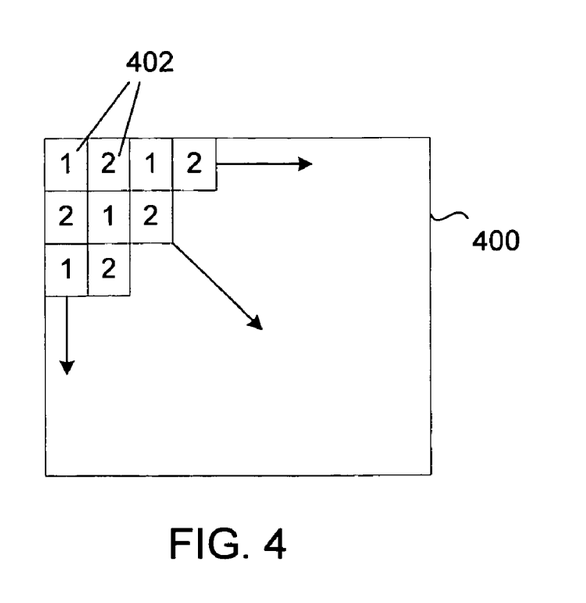
FIG. 4 is a top view of a sensor and a patterned filter layer in an embodiment in accordance with the invention.

Referring to FIG. 4, there is shown a top view of a sensor and a patterned filter layer in an embodiment in accordance with the invention. In this embodiment, sensor 400 is incorporated into detector 100 (FIGS. 1, 2), and is configured as a complementary metal-oxide semiconductor (CMOS) imaging sensor. Sensor 400, however, may be implemented with other types of imaging devices in other embodiments in accordance with the invention, such as, for example, a charge-coupled device (CCD) imager.

A patterned filter layer 402 is formed on sensor 400 using filter materials that cover alternating pixels in the sensor 400. The filter is determined by the wavelengths being used by light sources 102, 104. For example, in an embodiment in accordance with the invention, patterned filter layer 402 includes regions (identified as 1) that include a filter material for selecting the wavelength used by light source 102, while other regions (identified as 2) include a filter material for selecting the wavelength used by light source 104.

In the embodiment shown in FIG. 4, patterned filter layer 402 is deposited as a separate layer of sensor 400, such as, for example, on top of an underlying layer, using conventional deposition and photolithography processes while still in wafer form. In another embodiment in accordance with the invention, patterned filter layer 402 can be created as a separate element between sensor 400 and incident light. Additionally, the pattern of the filter materials can be configured in a pattern other than a checkerboard pattern. For example, the patterned filter layer can be formed into an interlaced striped or a non-symmetrical configuration (e.g. a 3-pixel by 2-pixel shape). The patterned filter layer may also be incorporated with other functions, such as color imagers.

Various types of filter materials can be used in the patterned filter layer 402. The filter material includes a polymer doped with pigments or dyes in an embodiment in accordance with the invention. In other embodiments in accordance with the invention, the filter material may include interference filters, reflective filters, and absorbing filters made of semiconductors, other inorganic materials, or organic materials.

Figure 5:
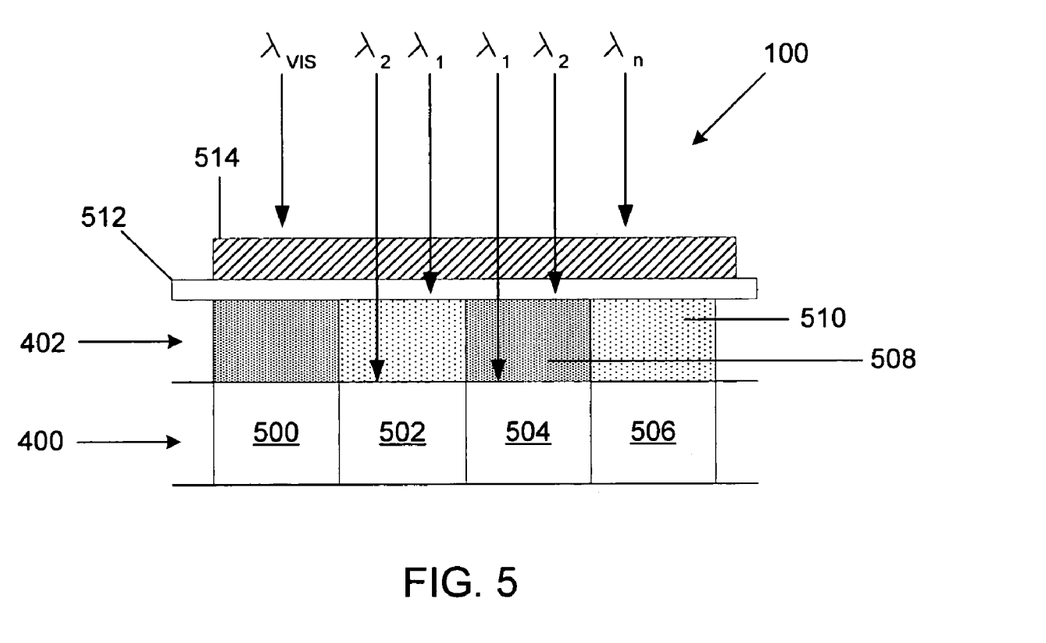
FIG. 5 is a cross-sectional view of detector 100 in an embodiment in accordance with the invention.

FIG. 5 is a cross-sectional view of detector 100 in an embodiment in accordance with the invention. Only a portion of the detector is shown in this figure. Detector 100 includes sensor 400 comprised of pixels 500, 502, 504, 506, patterned filter layer 402 including alternating filter regions 508, 510, glass cover 512, and dual-band narrowband filter 514. Sensor 400 is configured as a CMOS imager and the patterned filter layer 402 as a polymer doped with pigments or dyes in this embodiment in accordance with the invention. Each region in the patterned filter layer 402 (e.g. a square in the checkerboard pattern) overlies a pixel in the CMOS imager.

Narrowband filter 514 and patterned filter layer 402 form a hybrid filter in this embodiment in accordance with the invention. When light strikes narrowband filter 514, light propagating at wavelengths other than the wavelength of light source 102 ($\lambda_1$) and light source 104 ($\lambda_2$) is filtered out, or blocked, from passing through the narrowband filter 514. Light propagating at visible wavelengths ($\lambda_{VIS}$) and wavelengths ($\lambda_n$) is also filtered out, where $\lambda_n$ represents a wavelength other than $\lambda_1$, $\lambda_2$, and $\lambda_{VIS}$. Light propagating at or near wavelengths $\lambda_1$ and $\lambda_2$ pass through narrowband filter 514. Thus, only light at or near the wavelengths $\lambda_1$ and $\lambda_2$ passes through glass cover 512. Thereafter, polymer 508 transmits the light at wavelength $\lambda_1$ while blocking the light at wavelength $\lambda_2$. Consequently, pixels 500 and 504 receive only the light at wavelength $\lambda_1$, thereby generating the image taken with the light source 102.

Polymer 510 transmits the light at wavelength $\lambda_2$ while blocking the light at wavelength $\lambda_1$, so that pixels 502 and 506 receive only the light at wavelength $\lambda_2$. In this manner, the image taken with light source 104 is generated. Narrowband filter 514 is a dielectric stack filter in an embodiment in accordance with the invention. Narrowband filter 514 is designed to have one transmission peak at $\lambda_1$ and another transmission peak at $\lambda_2$.

Figure 6:
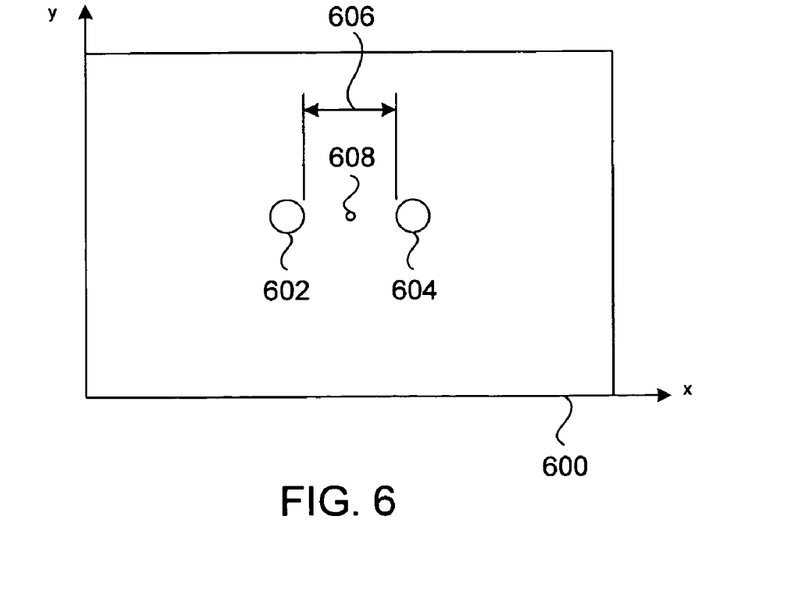
FIG. 6 depicts a difference image illustrating a first gaze direction in an embodiment in accordance with the invention.

Referring to FIG. 6, there is shown a difference image illustrating a first gaze direction in an embodiment in accordance with the invention. Difference image 600 includes pupils 602, 604 with a distance 606 between pupils 602, 604. Difference image 600 illustrates the position of pupils 602, 604 when a person is looking at the road while driving a vehicle in an embodiment in accordance with the invention. Hereinafter this gaze direction is referred to as a road ahead gaze direction.

Because the detector used to capture the images of the pupils is fixed in its location in an embodiment in accordance with the invention, a Cartesian coordinate grid is associated with difference image 600 and used to determine the (x, y) coordinates for point 608. Point 608 is determined as a midpoint location positioned between pupils 602, 604 in an embodiment in accordance with the invention. In other embodiments in accordance with the invention, point 608 is determined as another point that is present in the difference images, such as, for example, one of the pupils 602, 604 or another point positioned between pupils 602, 604.

The position of midpoint location 608 is monitored and compared against a reference midpoint location in order to determine a gaze direction of pupils 602, 604. A reference midpoint location is positioned on or near the (x, y) coordinates of (0, 0) and a shift in the x-direction, the y-direction, or in both directions is used to determine other gaze directions in an embodiment in accordance with the invention. A method for determining the gaze location is described in more detail in conjunction with FIGS. 12A-12B.

Figure 7:
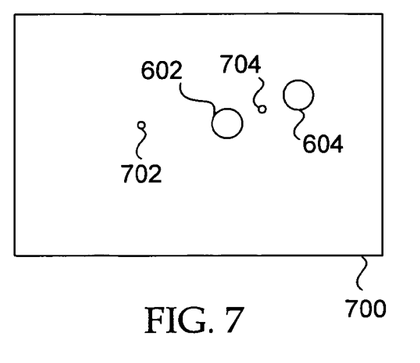
FIG. 7 illustrates a difference image illustrating a second gaze direction in an embodiment in accordance with the invention.

FIG. 7 illustrates a difference image illustrating a second gaze direction in an embodiment in accordance with the invention. Difference image 700 includes pupils 602, 604, reference midpoint location 702, and current midpoint location 704. Difference image 700 illustrates the position of pupils 602, 604 when a driver is looking at the driver side view mirror in an embodiment in accordance with the invention. The differences in the x and y values for the reference and current midpoint locations are used to identify the gaze direction as the driver side view mirror in an embodiment in accordance with the invention.

Figure 8:
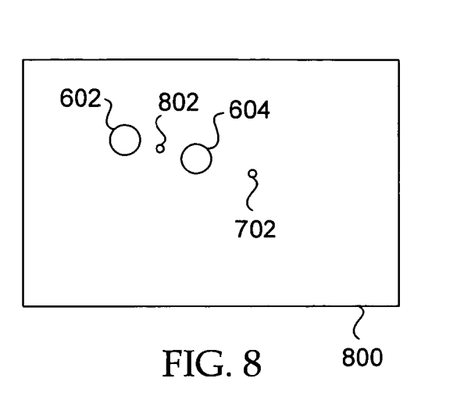
FIG. 8 depicts a difference image illustrating a third gaze direction in an embodiment in accordance with the invention.

Referring to FIG. 8, there is shown a difference image illustrating a third gaze direction in an embodiment in accordance with the invention. Difference image 800 includes pupils 602, 604, reference midpoint location 702, and current midpoint location 802. Difference image 800 depicts the position of pupils 602, 604 when a driver is looking at a control area located in the dashboard to the right of the driver in an embodiment in accordance with the invention. The control area includes, for example, a stereo, a compact disc player, air conditioning controls, and a navigation system. The differences in the x and y values for the reference and current midpoint locations are used to identify the gaze direction as the control area in the dashboard in an embodiment in accordance with the invention.

Figure 9:
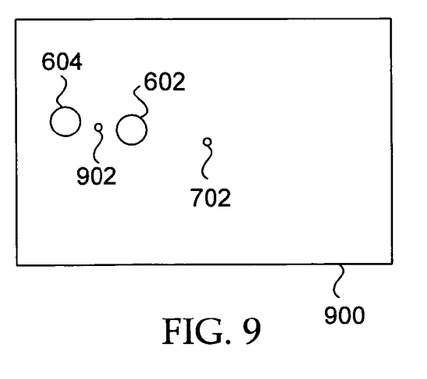
FIG. 9 illustrates a difference image illustrating a fourth gaze direction in an embodiment in accordance with the invention.

FIG. 9 illustrates a difference image illustrating a fourth gaze direction in an embodiment in accordance with the invention. Difference image 900 includes pupils 602, 604, reference midpoint location 702, and current midpoint location 902. Difference image 900 illustrates the position of pupils 602, 604 when a driver is looking at the passenger side view mirror in an embodiment in accordance with the invention. The differences in the x and y values for the reference and current midpoint locations are used to identify the gaze direction as the passenger side mirror in an embodiment in accordance with the invention.

Figure 10:
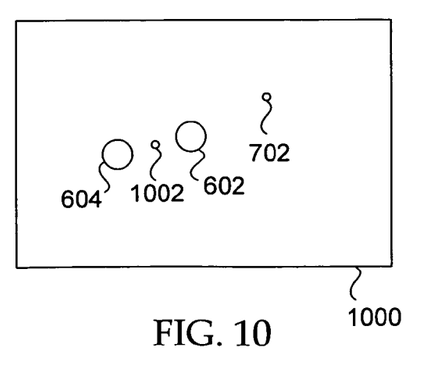
FIG. 10 illustrates a difference image illustrating a fourth gaze direction in an embodiment in accordance with the invention.

Referring to FIG. 10, there is shown a difference image illustrating a fourth gaze direction in an embodiment in accordance with the invention. Difference image 1000 includes pupils 602, 604, reference midpoint 702, and current midpoint 1002. Difference image 1000 depicts a position of pupils 602, 604 when a driver is looking at the rear view mirror in an embodiment in accordance with the invention. The differences in the x and y values for the reference and current midpoint locations are used to identify the gaze direction as the rear view mirror in an embodiment in accordance with the invention.

Figure 11:
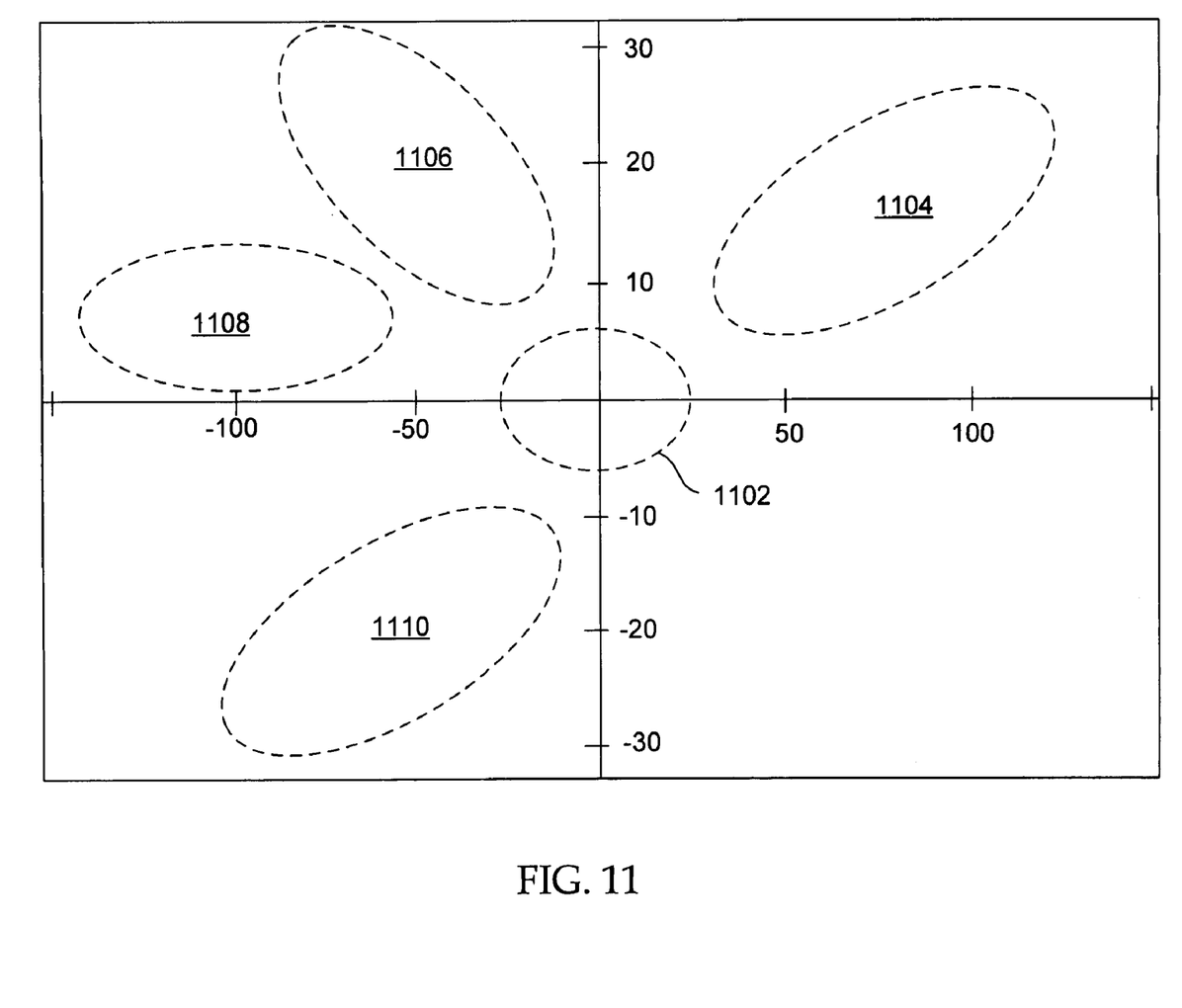
FIG. 11 is a plot of potential shift amounts in the x-direction and the y-direction for the five gaze directions shown in FIGS. 6-10.

FIG. 11 is a plot of potential shift amounts in the x-direction and the y-direction for the five gaze directions shown in FIGS. 6-10. Plot 1100 includes areas 1102, 1104, 1106, 1108, 1110 with each area corresponding to a gaze direction in an embodiment in accordance with the invention. The current midpoint locations having (x, y) coordinates that surround the intersection of the x and y axes correspond to the road ahead gaze direction. Area 1102 illustrates the boundaries of the x and y shifts from the reference (x, y) midpoint locations that are included in the facing-forward gaze direction.

The current midpoint locations having (x, y) coordinates that fall within area 1104 correspond to the driver side view mirror gaze direction. A current midpoint location having (x, y) coordinates within area 1104 results in a determination that the gaze direction of the driver is towards the driver side view mirror in an embodiment in accordance with the invention.

Area 1106 illustrates the boundaries of the control area in the dashboard gaze direction. A current midpoint location having (x, y) coordinates within area 1106 results in a determination that the gaze direction of the driver is towards the control area in the dashboard in an embodiment in accordance with the invention.

The current midpoint locations having (x, y) coordinates that fall within area 1108 correspond to the passenger side view mirror gaze direction. A current midpoint location having (x, y) coordinates within area 1108 results in a determination that the gaze direction of the driver is towards the passenger side view mirror in an embodiment in accordance with the invention.

And finally, area 1110 depicts the boundaries of the rear view mirror gaze direction. A current midpoint location having (x, y) coordinates within area 1110 results in a determination that the gaze direction of the driver is towards the rear view mirror in an embodiment in accordance with the invention.

Although FIG. 11 illustrates five areas 1102, 1104, 1106, 1108, 1110, other embodiments in accordance with the invention are not limited to the number, shape, and area of areas 1102, 1104, 1106, 1108, 1110. The number of areas and their corresponding gaze directions may be different in other embodiments in accordance with the invention. The boundaries of areas 1102, 1104, 1106, 1108, 1110 may be located at different positions in other embodiments in accordance with the invention. And finally, areas 1102, 1104, 1106, 1108, 1110 may include a different number of (x, y) coordinate values and form different shapes in other embodiments in accordance with the invention.

Figure 12A:
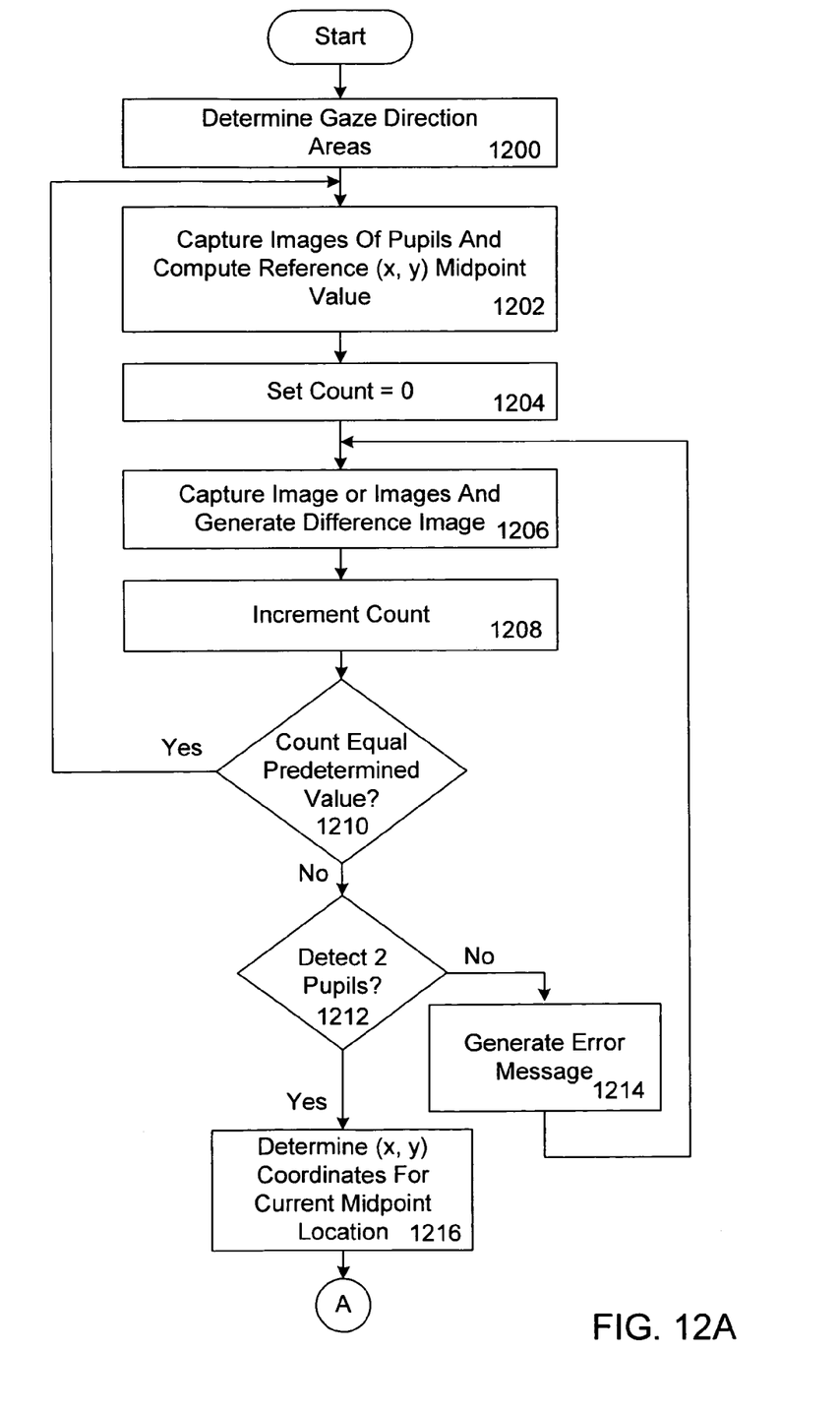
FIGS. 12A-12B depict a flowchart of a method for determining gaze direction in an embodiment in accordance with the invention.
Figure 12B:
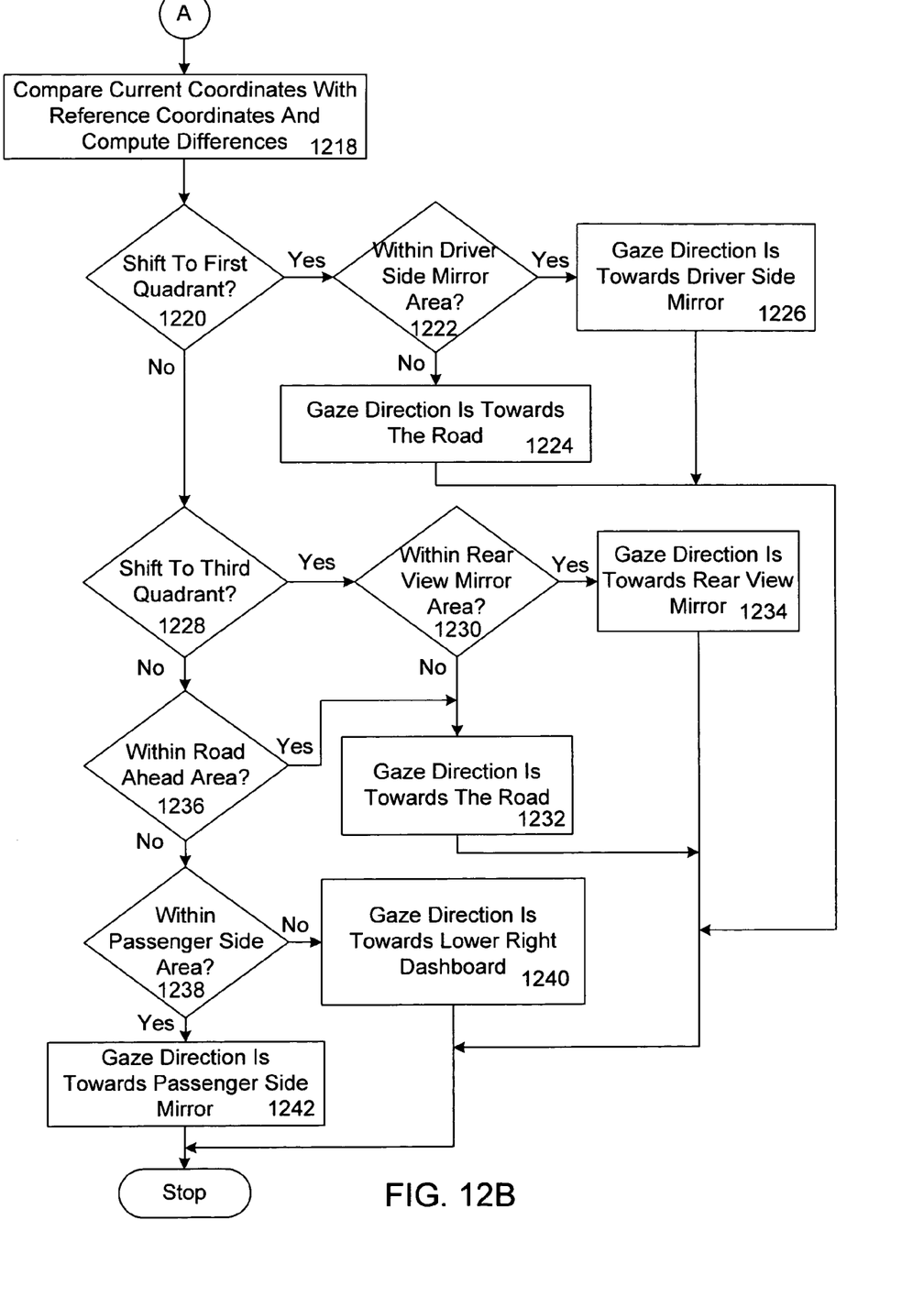

FIGS. 12A-12B depict a flowchart of a method for determining gaze direction in an embodiment in accordance with the invention. Initially the gaze direction areas are determined, as shown in block 1200. Gaze direction areas 1102, 1104, 1106, 1108, 1110 shown in FIG. 11 are examples of gaze direction areas in an embodiment in accordance with the invention. Next, at block 1202, a given number of images of the pupils are captured and the reference midpoint location is determined. The number of images used to compute the (x, y) coordinates of the reference midpoint location is determined by the application. The position of the imager and the design of the interior of the vehicle are two examples of the factors to consider when determining the number of images to capture.

The reference midpoint location is represented with a statistical computation in an embodiment in accordance with the invention. For example, the reference midpoint location is determined by computing an average of the x and y values for the midpoint locations in the captured images in an embodiment in accordance with the invention. In another embodiment in accordance with the invention, the reference midpoint location is determined with a different statistical value, such as, for example, a median or mode value.

After the reference midpoint location is determined, a count is set to zero at block 1204. The count is used to determine how much time will pass before another reference midpoint location is determined. The new reference midpoint location may be the same as a previous midpoint location or it may be different. The midpoint reference location is monitored in the embodiment of FIG. 12 because a person typically sits in different positions when driving, especially during long drives. The number of incorrect gaze direction determinations is reduced or eliminated by monitoring the reference midpoint location.

An image or images are then captured and a difference image is generated at block 1206. A composite image is captured and the two sub-frames in the composite image are used to generate the difference image in an embodiment in accordance with the invention. In another embodiment in accordance with the invention, two distinct images are captured and used to generate a difference image.

The count is then incremented by one, as shown in block 1208. A determination is made at block 1210 as to whether the count equals a predetermined value. If so, the method returns to block 1202 and a new reference midpoint location is determined. If the count does not equal the predetermined value, a determination is made as to whether two pupils are detected in the difference image (block 1212). If not, an error message is generated at block 1214 and the process returns to block 1206. The error message indicates a gaze direction has not been determined in an embodiment in accordance with the invention.

When two pupils are detected at block 1212, the (x, y) coordinates of the current midpoint location are determined (block 1216). The coordinates for the current midpoint location are then compared with the coordinates for the reference midpoint location and any differences in the x- and y-directions computed, as shown in block 1218. A determination is then made at block 1220 as to whether the differences between the current midpoint location and the reference midpoint location, when mapped on a plot similar to that of FIG. 11, indicate the gaze direction has shifted to the first quadrant. If so, a determination is made at block 1222 as to whether the current midpoint location has shifted to the driver side mirror area (e.g., area 1104 in FIG. 11). If not, the gaze direction is determined to be towards the road (e.g., area 1102 in FIG. 11), as shown in block 1224. If the current midpoint location has shifted to the driver side mirror area, the gaze direction is determined to be towards the driver side mirror (block 1226).

Referring again to block 1220, if the gaze direction has not shifted to the first quadrant, a determination is made at block 1228 as to whether the gaze direction has shifted to the third quadrant. If so, a determination is made at block 1230 as to whether the current midpoint location has shifted to the rear view mirror area (e.g., area 1110 in FIG. 11). If not, the gaze direction is determined to be towards the road, as shown in block 1232. If the current midpoint location has shifted to the rear view mirror area, the gaze direction is determined to be towards the rear view mirror (block 1234).

Referring again to block 1228, if the gaze direction has not shifted to the third quadrant, a determination is made at block 1236 as to whether the gaze direction corresponds to the road ahead area. If so, the gaze direction is determined to be towards the road (block 1232). If the gaze direction does not correspond to the road ahead gaze direction, a determination is made at block 1238 as to whether the current midpoint location has shifted to the passenger side mirror area (e.g., area 1108 in FIG. 11). If not, the gaze direction is determined to be towards the control area in the dashboard (e.g., area 1106 in FIG. 11), as shown in block 1240. If the current midpoint location does lie within the rear view mirror area, the gaze direction is determined to be towards the rear view mirror (block 1242).

As discussed earlier, determining the gaze direction of a driver in a vehicle may be used to activate an alarm when the driver is looking somewhere other than the road. The alarm may be used to alert the driver to a potential safety hazard such as, for example, a possible collision with another vehicle or object. Although the embodiments in accordance with the invention described herein discuss five gaze directions, other embodiments in accordance with the invention are not limited to the same number and type of gaze directions. For example, other embodiments in accordance with the invention may use a glove box gaze direction, which is applicable when the driver is looking towards the glove box in the dashboard. As another example, other embodiments in accordance with the invention may include the road ahead gaze direction and a "not road ahead" gaze direction, whereby any shift in the current midpoint location that is not included in the road ahead gaze direction is identified as a "not road ahead" gaze direction.

The embodiments shown in FIGS. 6-10 and FIGS. 12A-12B use the coordinates for a midpoint location positioned between the pupils to determine the gaze direction of the pupils. Other embodiments in accordance with the invention are not limited to this technique. Different techniques or calculations may be used to determine gaze direction. For example, changes in a tilt or angle of a line passing through the center of the pupils may be computed with respect to a reference line or axis in order to determine gaze direction. As another example, a system can include a fixed reflecting target in the field of view of the detector. The fixed reflecting target appears in a difference image and the position of one or more pupils, or points associated with the pupils, are compared with the fixed reflecting target to determine gaze direction.

The invention claimed is:

1. A pupil detection system, comprising:
   an imager operable to capture images of the pupils, wherein the imager comprises a hybrid filter comprising:
   a dual-band narrowband filter with a first transmission peak at a first wavelength of a first light source and a second transmission peak at a second wavelength of a second light source, wherein the dual-band narrowband filter is configured to substantially block wavelengths of light other than approximately the first wavelength and the second wavelength; and
   a patterned filter layer to receive light at the first and second wavelength from the dual-band narrowband filter, wherein the patterned filter layer comprises:
   areas of a first filter characteristic to transmit light at approximately the first wavelength to corresponding pixels of the imager; and
   areas of a second filter characteristic to transmit light at approximately the second wavelength to other corresponding pixels of the imager; and
   a processing unit operable to generate a difference image using the captured images, wherein the difference image indicates a position of the pupils due to differential reflectivity from retinal return in the captured images, and to determine a gaze direction for the pupils using the difference image.

2. The pupil detection system of claim 1, further comprising one or more light sources operable to emit light towards the pupils, wherein the light strikes the pupils at two or more different angles of incidence, wherein a difference between the angles of incidence corresponds to the differential reflectivity from the retinal return in the captured images.

3. The pupil detection system of claim 2, wherein the one or more light sources comprise a broadband light source.

4. The pupil detection system of claim 1, wherein the processing unit is operable to determine the gaze location by determining a difference between a current point location and a reference point location associated with the pupils, wherein the reference point location comprises a reference midpoint location between the pupils determined over a plurality of the captured images, and the current point location comprises a current midpoint location between the pupils.

5. The pupil detection system of claim 1, wherein the imager is operable to capture the images of the pupils in a composite image, wherein the composite image comprises at least two sub-frame images which comprise separate portions of the composite image and together form a complete image, wherein the at least two sub-frame images are captured using light propagating at different wavelengths.

6. The pupil detection system of claim 1, wherein the captured images comprise two distinct images.

7. The pupil detection system of claim 1, wherein the captured images are captured simultaneously.

8. The pupil detection system of claim 1, wherein the captured images are captured successively.

9. A method for determining a gaze direction in a pupil detection system, the method comprising:
   capturing one or more images of a person's pupils using an imager which comprises a hybrid filter comprising:
   a dual-band narrowband filter with a first transmission peak at a first wavelength of a first light source and a second transmission peak at a second wavelength of a second light source, wherein the dual-band narrowband filter is configured to substantially block wavelengths of light other than approximately the first wavelength and the second wavelength; and
   a patterned filter layer to receive light at the first and second wavelength from the dual-band narrowband filter, wherein the patterned filter layer comprises:
   areas of a first filter characteristic to transmit light at approximately the first wavelength to corresponding pixels of the imager; and
   areas of a second filter characteristic to transmit light at approximately the second wavelength to other corresponding pixels of the imager;
   generating a difference image using the captured images, wherein the difference image indicates a position of the pupils due to differential reflectivity from retinal return in the captured images; and
   determining a gaze direction for the pupils using the difference image.

10. The method of claim 9, further comprising emitting light towards the pupils.

11. The method of claim 9, wherein:
    capturing the images comprises capturing a composite image; and
    generating the difference image using the captured images comprises subtracting a first sub-frame in the composite image from a second sub-frame in the composite image.

12. The method of claim 9, wherein:
    capturing the images comprises capturing two distinct images; and
    generating the difference image comprises subtracting one of the captured image from the other captured image.

13. The method of claim 9, wherein determining a gaze direction comprises:
    determining a current point location in the difference image, wherein the current point location comprises a current midpoint location between the pupils;
    determining a difference between the current point location and a reference point location, wherein the reference point location comprises a reference midpoint location between the pupils determined over a plurality of the captured images; and determining a gaze direction for the pupils using the difference between the current and reference point locations.

14. The method of claim 13, further comprising determining the reference point location, wherein determining the reference point location comprises:

capturing a plurality of images of the pupils;

determining a plurality of difference images using the captured images;

determining a point location in each of the difference images; and determining a reference point location using the point locations for each of the difference images, wherein the reference point location comprises a statistical representation of the plurality of point locations in the plurality of difference images.

15. The method of claim 14, further comprising incrementing a count of the number of captured images each time an image of the pupils is captured.

16. The method of claim 15, further comprising re-computing the reference point location after a predetermined number of images has been captured.

17. The method of claim 14, wherein the statistical representation of the plurality of point locations in the plurality of difference images comprises a mean for each of a plurality of horizontal values (x) and a plurality of vertical values (y).

18. The method of claim 9, wherein capturing one or more images of the pupils comprises successively capturing images of the pupils.

19. The method of claim 9, wherein capturing one or more images of the pupils comprises simultaneously capturing one or more images of the pupils.

20. The pupil detection system of claim 1, wherein the processing unit is further operable to activate an alarm in response to a determination that the gaze direction for the pupils of a driver of a vehicle is directed at a location other than a road ahead gaze direction, wherein the road ahead gaze direction corresponds to the pupils looking in a direction toward a road.

* * * * *